United States Patent
Mathur

(10) Patent No.: US 9,853,982 B2
(45) Date of Patent: Dec. 26, 2017

(54) IMAGE-BASED GROUP PROFILES

(71) Applicant: Comcast Cable Communications, LLC, Philadelphia, PA (US)

(72) Inventor: Arpit Mathur, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 14/686,617

(22) Filed: Apr. 14, 2015

(65) Prior Publication Data

US 2016/0308872 A1 Oct. 20, 2016

(51) Int. Cl.
  G06F 7/04 (2006.01)
  H04L 29/06 (2006.01)
  G06K 9/00 (2006.01)
  H04L 29/08 (2006.01)

(52) U.S. Cl.
  CPC ........ H04L 63/102 (2013.01); G06K 9/00228 (2013.01); G06K 9/00268 (2013.01); G06K 9/00288 (2013.01); H04L 63/0861 (2013.01); H04L 67/306 (2013.01)

(58) Field of Classification Search
  CPC ..... H04L 63/08; H04L 63/101; H04L 63/102; H04L 63/104
  USPC .............................................. 726/4; 713/168
  See application file for complete search history.

(56) References Cited

U.S. PATENT DOCUMENTS

| | | | | |
|---|---|---|---|---|
| 8,867,849 | B1* | 10/2014 | Kirkham | G06F 17/30268 382/224 |
| 2009/0187569 | A1* | 7/2009 | Lubarski | G06F 17/3089 |
| 2011/0270947 | A1* | 11/2011 | Cok | G06Q 30/0601 709/217 |
| 2012/0246184 | A1* | 9/2012 | Rothschild | G06F 17/30047 707/758 |
| 2013/0091213 | A1* | 4/2013 | Diab | G06Q 50/01 709/204 |
| 2015/0161272 | A1* | 6/2015 | Broerse | G06F 17/30038 707/722 |
| 2015/0227609 | A1* | 8/2015 | Shoemaker | G06K 9/00295 707/737 |
| 2015/0271182 | A1* | 9/2015 | Givoni | H04L 63/10 726/4 |

* cited by examiner

Primary Examiner — Samson Lemma
(74) Attorney, Agent, or Firm — Baker & Hostetler LLP

(57) ABSTRACT

An image of users of an application may be received from a computing device on a home network. The image may comprise representations of a group of users. Recognition techniques may be applied to the image. Unclaimed profiles may be created for users who are not recognized. The unclaimed profiles may be utilized by applications prior to being claimed by a user or group. Access to the unclaimed profiles may be controlled based on the identity of the network gateway used in the transmission of the image used as the basis for forming the profile.

20 Claims, 8 Drawing Sheets

US 9,853,982 B2

IMAGE-BASED GROUP PROFILES

BACKGROUND

A computer-executable application may access and maintain profile information corresponding to users of the application. The profile information may be used for a variety of purposes, such as tracking the identity of a user, storing metadata about a user such as his or her name, date of birth, personal interests, and so forth, and storing application data related to the user. For example, in an exercise application, a user's name, height, weight, and exercise history might be stored in association with a profile, along with information about the user's favorite sports.

Typically, an application that depends on profile information will instruct users to set up a profile prior to using the primary features of the application. For example, in the case of an exercise application, the application might guide a user through a sequence of screens in which the user enters his name, age, weight, favorite sports, and so on. The primary features of the application—such as tracking progress in a series of exercises—might be unavailable until the profile is complete. The profile set-up process may take a considerable amount of time, particularly when a group of users must each set up their individual profiles.

SUMMARY

Disclosed herein are systems, methods, and computer program products involving a mechanism for creating and managing individual and group profiles for use in a computer-executable application, where minimal user interaction is required to create and use the profiles in the application. The disclosed systems, methods, and computer program products further involve methods for controlling access to profiles and for allowing individuals and groups to customize profiles with a reduced amount of user interaction as compared to conventional techniques.

A computing device may be connected to a camera that, when activated, captures an image of users of an application that is to make use of profile information. The image may be transmitted via a network gateway that connects the computing device to an external network, such as the Internet. A server may receive the image and extract from the image various identifying characteristics of the depicted users. For an unrecognized user, the server may store a profile that contains identifying characteristics of the unrecognized user, as well as state information indicating that the profile has not yet been claimed. The application may then begin to use the unclaimed profile as well as any previously claimed profiles.

The server may subsequently receive a request to claim the profile for the previously unrecognized user. The request may be validated based at least in part on a determination that the request to claim the profile was transmitted through the same network gateway as the image used as the basis for forming the unclaimed profile. If validated, the profile may be updated to indicate that it has been claimed. The profile may also be updated to include additional information that might be supplied by or about the user as part of the claiming process.

Various advantages of the systems, methods, and computer program products described herein will be set forth in part in the description that follows or may be learned by practice. The advantages will be realized and attained by means of the elements and combinations listed in the appended claims. Both the foregoing general description and the following detailed description are exemplary and explanatory only.

BRIEF DESCRIPTION OF THE DRAWINGS

The accompanying drawings are incorporated in and constitute a part of this specification. Together with the description, the drawings may serve to explain operational principles of various methods, systems, computer-readable media, and computer program products disclosed herein. For the purposes of illustration, various examples of aspects of the disclosure are shown in the drawings; however, the invention is not limited to the specific methods and instrumentalities disclosed.

DETAILED DESCRIPTION

Figure 1A:
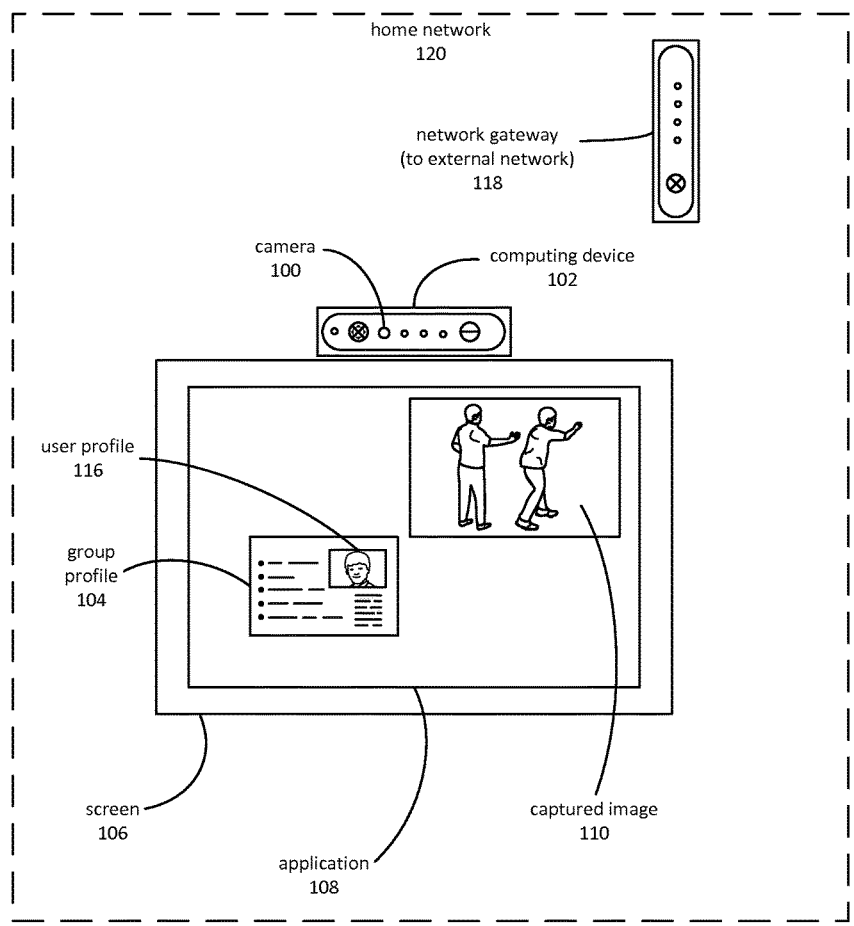
FIG. 1A is a block diagram depicting an example system that captures and utilizes user and group profiles.

The disclosed systems, methods, and computer program products involve enabling group and user profile information to be used by a computer-executable application with reduced up-front effort on the part of the application's users. In an example embodiment, facial recognition techniques may be applied to an image of a user or group captured at or prior to an initial use of the application. The facial recognition techniques may be applied to identify users who have already set up, or "claimed," their profiles. For unrecognized users, an "unclaimed" profile may be set up and used by the application without requiring further interaction by the users. A group profile may also be formed and used by the application without requiring all of the associated user profiles to be claimed.

The disclosed systems, methods, and computer program products also involve techniques for controlling access to unclaimed profiles and for allowing unclaimed profiles to be claimed. The techniques may further reduce effort required of the user by utilizing factors other than user input for controlling access. In an example embodiment, identifying characteristics of a network gateway associated with the creation of the profile may be subsequently used as an authentication mechanism. In the example embodiment, an image may be captured and transmitted by a computing device connected to a home network. The home network may be connected to an external network, such as the Internet, via a network gateway. The image may be transmitted, over the network gateway and the Internet, to a server that processes the image, performs facial recognition, and creates unclaimed profiles for faces that are not recognized. The server stores, with the unclaimed profiles, information that identifies the particular network gateway used in the transmission. When the server subsequently receives a request to view or claim a profile, it may check to see that the request was transmitted over the same network gateway. If so, the request may be authorized and the profile may be viewed and claimed.

The disclosed systems and methods may reduce the amount of user interaction involved in setting up and using a profile prior to using an application. As an example, consider a fitness application in which each member of a family may participate. Rather than requiring each member of the family to set up a profile, which might act as a barrier to participating, various aspects of the present disclosure may be applied to allow for individual profiles and a group profile to be set up using a family photograph. Later, perhaps after the family has been using the fitness application for some time, the participants might claim and customize their profiles to reflect their names and personal interests. Aspects of the present disclosure protect the unclaimed profiles from unauthorized access, even when the profiles are stored on an external server, while still providing a convenient mechanism for viewing and claiming profiles that the participants are authorized to view.

FIG. 1A is a block diagram depicting an example system that captures and utilizes user and group profiles. A group profile 104 may be formed by the system to comprise information describing users who are members of a group—for example, a user 114 might be part of a group 112, and might be represented in a group profile 104 by a user profile 116. Typical approaches to defining group profiles or member profiles may require that users perform a number of configuration steps prior to using an application that depends on the profile information. The system of FIG. 1A, on the other hand, may require fewer or no configuration steps for defining group or user profiles prior to use of an application 108.

A computing device 102 may include a camera 100 usable for capturing an image of a group 112. The group 112 may contain one or more users, such the user 114 depicted in FIG. 1A. Accordingly, the captured image 110 can comprise a visual representation of the group 112, including members of the group such as the depicted user 114. A computing device 102 may be part of a home network 120 comprising a network gateway 118, which may connect computing devices on the home network 120, including the computing device 102, to an external network such as the Internet. The computing device 102 may communicate with various hosted services (not shown) via a network gateway 118 and the external network.

The members of the group 112 may, either individually or as a group, interact with an application 108. The application 108 may be a computer-executing process operating on the computing device 102 and displayed on a screen 106. The application 108 may respond to interaction using a group profile 104 and/or a user profile 116. The group profile 104 may be associated with or contain one or more user profiles, such as the depicted user profile 116. The application 108 may utilize the profile information for a variety of purposes, such as customizing application behavior to the interests of a group or user, tracking user accomplishments, promoting group interaction, and so on.

A user profile 116 may comprise information about a user such as name, email address, tags indicative of the user's interests and hobbies, and so forth. However, this information may not be available at the time a user or group initially desires to utilize the application. In various aspects, the user profile 116 and/or the group profile 104 may be created and used by an application before this information has been received. At some later stage, the user profile 116 and/or the group profile 104 may be "claimed" by an authorized user and/or group representative. An unclaimed profile may therefore refer to the user profile 116 or the group profile 104 before the unclaimed profile has been designated as belonging to a particular user or group. Similarly, a claimed profile may refer to the user profile 116 or the group profile 104 after ownership of the profile has been established. In various aspects, a profile such as the user profile 116 or the group profile 104 may be used by the application to correlate a profile to a particular user or group, even if the identities of the individuals are unknown. For example, an unclaimed profile might contain information that is sufficient to correlate the user profile 116 to the user 114. An application might utilize the unclaimed profile to track the progress of the user 114 in a physical fitness application. At some point, the user 114 might claim the user profile 116 and provide information such as name, address, and so forth. The application 108 could continue to use any data that had been previously associated with the user profile 116.

Figure 1B:
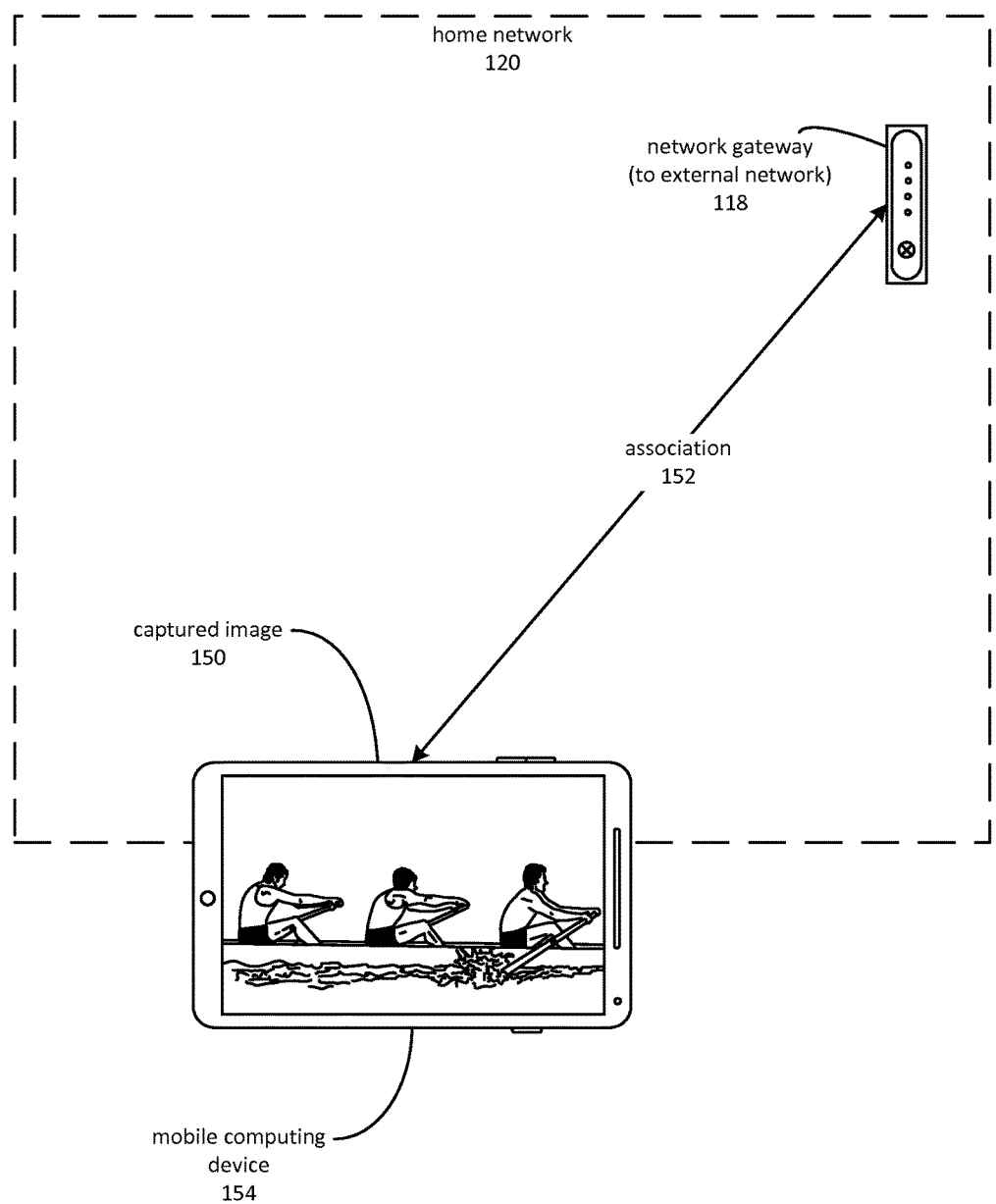
FIG. 1B is a block diagram depicting an example system that captures and utilizes user and group profiles based on images captured by a mobile computing device.

FIG. 1B is a block diagram depicting an example system that captures and utilizes user and group profiles based on images captured by a mobile computing device. In the example of FIG. 1B, a group may be formed based on an image or other media file captured by a mobile computing device 154.

The mobile computing device 154 may have an association 152 with a network gateway 118 based on periodically using the network gateway 118 to connect to the home network 120, or to access an external network, such as the Internet, via the network gateway 118. This might occur, for example, when the mobile computing device 154 is brought within the usable range of a wireless connection provided by the network gateway 118 or by some associated device.

Data for the image or other media file may be transmitted from the mobile computing device 154 directly to a hosted service via a cellular/wireless network (not shown), or transmitted via the network gateway 118 when the mobile computing device 154 is connected to the home network 120.

Information indicative of the association 152 may be stored when an unclaimed profile is formed, and subsequently utilize the information to validate a request to claim the profile. For example, the captured image 150 might be transmitted to a server accessible via the Internet directly or through the network gateway 118. A device identifier for the mobile computing device 154 might be stored on the server along with a profile based on the captured image 150. When an attempt to claim the profile is made, the server might verify that either the mobile computing device 154 is being used in the attempt to claim the image, or that another device associated with the network gateway 118 is being used. This verification may be based at least partly on a stored association 152 between the mobile computing device 154 and the network gateway 118.

Figure 2:
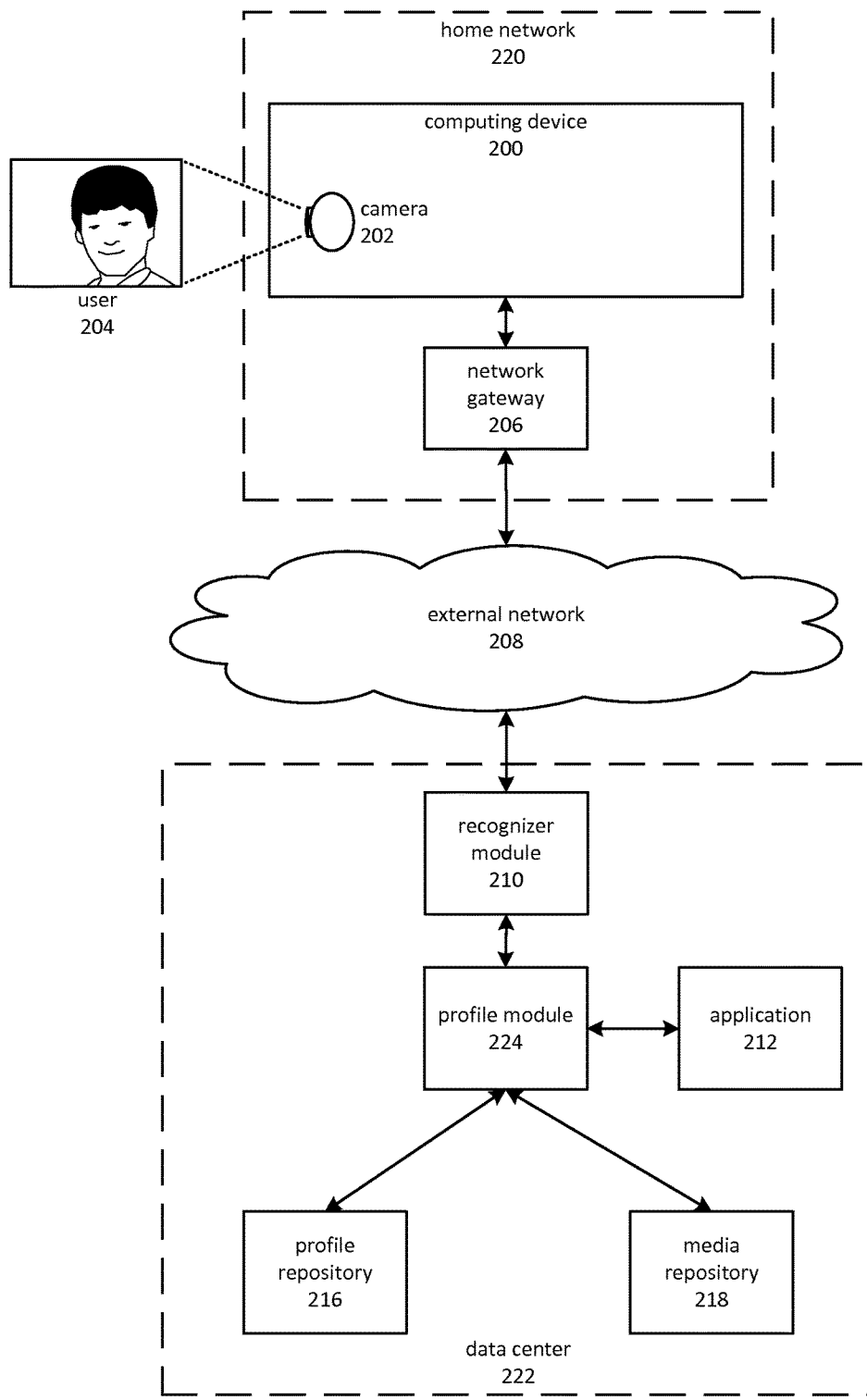
FIG. 2 is a block diagram depicting elements of an example system that captures and utilizes user and group profiles.

FIG. 2 is a block diagram depicting elements of an example system that captures and utilizes user and group profiles. A home network 220 may comprise various computing devices, such as the computing device 200 depicted in FIG. 2. In some instances, the computing device 200 might be a set-top box or other media device. The computing device 200 might include, or be in communication with, a camera 202, which can capture an image of a user or group. For example, the camera 202 might be triggered by the computing device 200 to capture an image of the user 204.

The computing device 200 might also include, or be in communication with, a network gateway 206. Devices on the home network 220 may be described as being connected to the interior side of network gateway 206. Computing devices on the interior or network gateway 206 may communicate with computing devices on another network by transmitting data through the network gateway 206.

The exterior side of network gateway 206 may be in communication with an external network 208. The external network 208 can comprise the Internet. Devices on the home network 220 may communicate with services operating at a data center 222 by transmitting and receiving messages through the network gateway 206 and the external network 208.

A recognizer module 210 may, in some instances, operate within the data center 222. The recognizer module 210 may receive image-related data captured by the camera 202 and processed by the computing device 200. The image-related data might, for example, comprise bitmap data that is representative of an image of the user 204 that has been captured by the camera 202. In some instances, the computing device 200 may perform various pre-processing operations on the image data. The functions of the recognizer module 210 might also be performed, in whole or in part, on the computing device 200.

The recognizer module 210 may identify regions of an image captured by the camera 202 to isolate identifying characteristics in an image of the user 204. In some instances, the identifying characteristics may comprise or be based on the user's face as represented in the image. For example, various features of the face of the user 204 might be extracted from the image. The features might include the size and position of various facial features, skin texture, facial contours, and so on. Collectively, these characteristics may uniquely correspond to the user 204, even if the actual identity of the user 204 is not known.

A profile module 224 may process the identifying characteristics extracted from the image by the recognizer module 210. In some cases, a profile for the user 204 may already exist. The profile module 224 may, in such cases, determine that the profile exists in a profile repository 216 using the identifying characteristics as a key. For example, a hash of the identifying characteristics could be used as the primary key in a relational database table containing user profile information. In other cases, a compound primary key consisting of the various identifying characteristics could be used.

A profile may be maintained in the profile repository 216 in a claimed state or in an unclaimed state. If no profile corresponding to the identifying characteristics of the user 204 is found in the profile repository 216, then the profile module 224 may form a new profile based on the identifying characteristics and store the profile in the profile repository 216. The newly formed profile can be stored initially in an unclaimed state.

An application 212 may access profiles through the profile module 224. Access to the profiles for the use of application 212 may be restricted based on the source of a request that the application is processing. For example, the application 212 may comprise a web-based application that renders user interface pages for a browser operating on the computing device 200. When the application 212 is rendering a page that utilizes a profile, the profile module 224 may ensure that the application is authorized to access the page, using the various techniques described herein. The profile module 224 might, for example, ensure that a request for a profile was transmitted through the same network gateway that was used when the profile was formed.

Although the identity of the user 204 may not be known before the profile is claimed, various additional characteristics may be automatically assigned to the profile. In some instances, the image captured by the camera 202 may include various users in addition to the user 204. Various features of these user's profiles, such as tags that describe the user's interests, may be replicated in the new profile. Relationships between the unidentified user and the other users might also be inferred, based on their shared presence in the image.

A media repository 218 may contain additional images or other media files containing representations of the user 204. The image or other media file may have been previously submitted for storage on behalf of the user 204 or some other user. The recognizer module 210 may analyze these images to determine possible user interest tags (not shown) to associate with the unclaimed profile. For example, the presence of a certain type of sports equipment in a photograph might indicate an interest in the corresponding sport. The recognizer module 210 might therefore associate the unclaimed profile with that interest.

Facial recognition, such as the process described with respect to the recognizer module 210, may be employed in analyzing images or other media files that are representative of other users. If a relationship between user 204 and the other users is inferred, the other users' interests might be applied to the unclaimed profile for the user 204.

The profile for the user 204 might be claimed at some time subsequent to its initial creation. At that time, the user 204 might edit any pre-assigned interest tags, relationship data, and so on.

Figure 3:
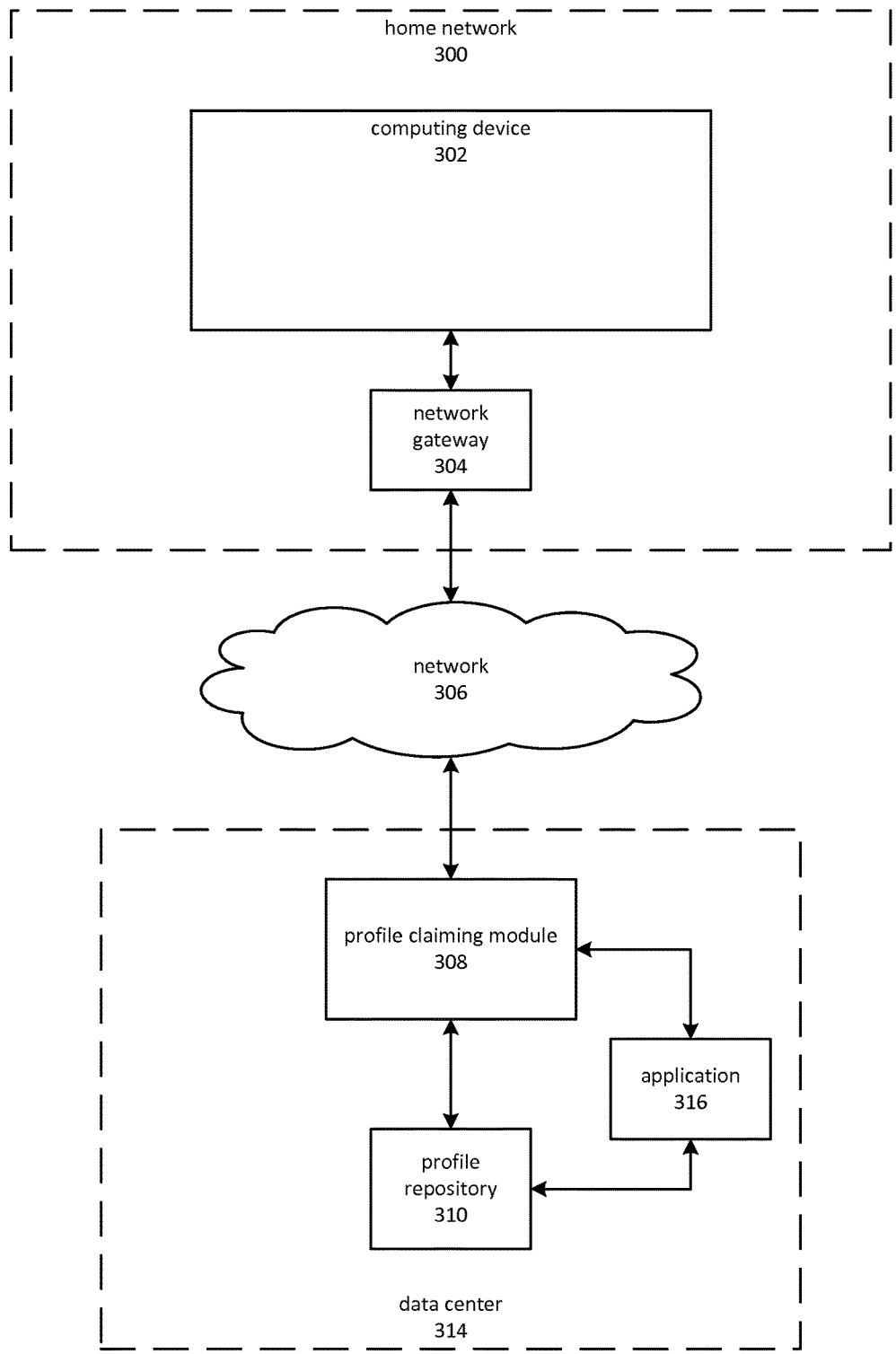
FIG. 3 is a block diagram depicting an example of a profile claiming system.

FIG. 3 is a block diagram depicting an example of a profile claiming system. A home network 300 may comprise one or more computing devices, such as the depicted computing device 302, connected to the interior of a network gateway 304. In some instances, the computing device 302 may comprise a set-top box or other media controller. The computing device 302 may also be integrated with the network gateway 304. In other instances, the computing device 302 might comprise a personal computer, smartphone, tablet, and so on.

Computing devices, such as the depicted computing device 302, may communicate via a network 306 with a profile claiming module 308 operating in a data center 314. The network 306 may be a public network, such as the Internet, or a private network. In some instances, functions of the profile claiming module 308 may be performed by the computing device 302.

An application 316 operating on a computing node in the data center 314 or on the computing device 302 may provide an interface for allowing users to claim unclaimed profiles. In various cases, the application 316 may be a browser-based application where some of the functions performed by the application 316 are performed by a computing node operating in the data center 314 and rendered on the client by a browser. The portion of the application executing on the computing node might, for example, transmit pages encoded in a markup language such as hypertext markup language. ("HTML") for rendering by a browser operating on the computing device 302.

The application 316 may perform operations related to the claiming of unclaimed profiles. These operations may include displaying a list of unclaimed profiles that a user or group is entitled to claim, and processing requests to claim profiles.

A profile claiming module 308 may retrieve unclaimed profiles on behalf of the application 316. A profile repository 310 may contain records corresponding to user or group profiles. The profiles contained in the repository 310 may include profiles that have been claimed, and may also include profiles that have not yet been claimed. The profile claiming module 308 may apply a filter to a retrieval operation performed on the profile repository 310 to cause only unclaimed profiles to be retrieved. In addition, the filter may also restrict the set of retrieved profiles to those that users of the application 316 are authorized to claim. In various instances, authorization to claim a profile may be based at least in part on a characteristic of the home network 300. For example, a profile created on the computing device 302 may be stored with data associated with the network gateway 304, such as a media access control ("MAC") address for the network gateway 304. Subsequently, when the application 316 issues a request to profile claiming module 308 to retrieve unclaimed profiles, the profile claiming module 308 may compare the MAC address of the gateway through which the request to access the unclaimed profiles was issued to the MAC addresses stored with the profiles. The profiles whose associated MAC address matches that of the MAC address associated with the request to retrieve unclaimed profiles can be returned to the application 316.

In some instances, a characteristic of the computing device 302 may be used to determine if an unclaimed profile is authorized to be claimed by a user. For example, a device identifier might be associated with the computing device 302. The computing device 302 might also have been used to capture an image based on which an unclaimed user and/or group profile was formed. The user and/or group profile might then have been stored in the profile repository 310 in a record that includes the device identifier of the computing device 302. The profile claiming module 308 can then, in response to a request to view unclaimed profiles, restrict the response to unclaimed profiles associated with a device identifier that is the same as the computing device that issued the request.

Profile claiming module 308 may also process requests to claim unclaimed profiles. The claiming of a profile may involve associating the profile with the identity of a user, as expressed by properties such as the user's name, handle, and so forth, as opposed to the various identifying characteristics extracted from an image or other media file and used as a placeholder for the user's identity in the unclaimed profile.

The profile claiming module 308 may validate a request to claim or otherwise modify a profile using characteristics of the home network 300, such as a MAC address or other identifier for the network gateway 304, or a device identifier of the computing device 302. For example, a request to claim or otherwise modify a profile might be validated by checking that the request was transmitted over the same network gateway used initially when the unclaimed profile was created, or that the request was transmitted from a device associated with the initial creation of the unclaimed profile. In some cases, records of devices such as a smartphone or table that have been connected to the data center 314 through network gateway 304 may be stored in profile repository 310. These devices may be authorized to claim or edit a profile based at least in part on the association between the device and network gateway, even if not currently connecting to data center 314 through the network gateway 304. In the case of a smartphone, this might occur as the smartphone is moved from inside of the home to outside of the home, for example.

Figure 4:
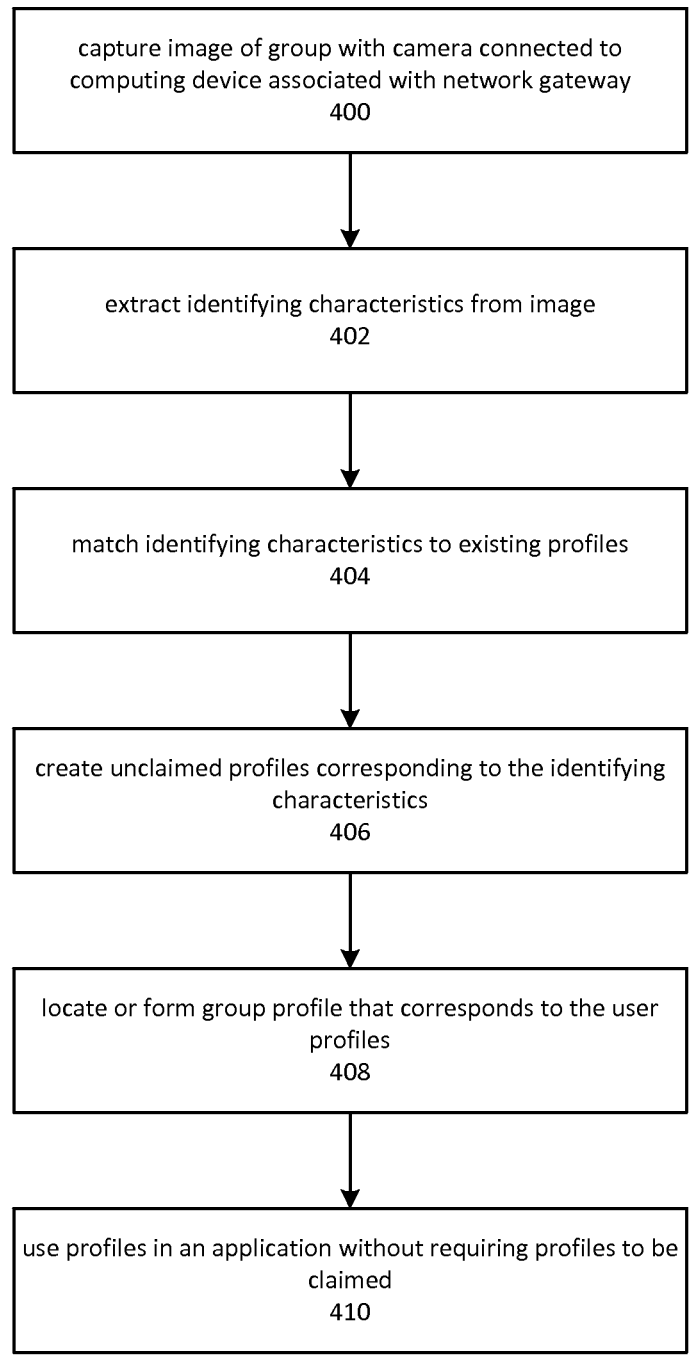
FIG. 4 is a flow diagram depicting an example process for capturing and utilizing user and group profiles.

FIG. 4 is a flow diagram depicting an example process for capturing and utilizing user and group profiles. Although FIG. 4 is depicted as a sequence of blocks, the depicted sequence should not be construed as limiting the scope of the present disclosure. In various cases, aspects, and embodiments, the blocks and depicted operations may be altered, omitted, reordered, or performed in parallel.

Block 400 depicts an example of capturing an image of a group of users, using a camera connected to a computing device. The computing device may be associated with a network gateway. In some cases, the computing device may be connected to the interior of the network gateway. For example, the computing device may be part of a home network, such as the home network 220 depicted in FIG. 2.

Block 402 depicts the recognizer module 210 analyzing the image to extract information that is indicative of various identifying characteristics of the users depicted in the image. The identifying characteristics can, for example, include facial characteristics such as data relating to the relative size and position of facial features, skin qualities, and so forth. In an example, the recognizer module 210 depicted in FIG. 2 may extract identifying characteristics, such as the relative size and position of facial features, from an image (or representation thereof) received from the computing device 200 and transmitted over the network gateway 206 and the external network 208. Identifying characteristics may also include non-facial characteristics, such as height. The recognizer module 210 may extract absolute and relative height information from images and use the height information as an additional identifying characteristic. Other examples of identifying characteristics that may be extracted by the recognizer module include estimated weight, estimated age, posture, and so on. Identifying characteristics from media files other than or in addition to images or the visual portion of a video may also be utilized. For example, voice recognition techniques may be used to extract identifying characteristics of an individual based on speech pattern, speech timbre, and so forth.

The identifying characteristics may, alone or in various combinations, be sufficient to uniquely correspond to a particular individual. Block 404 depicts an example of matching identifying characteristics to existing profiles. In some cases, a matched profile may have been claimed, while in other cases the matched profile may be unclaimed. In an example, a computing system at the data center 222 queries the profile repository 216 to determine whether any previously identified profiles correspond to the identifying characteristics extracted from the image. If so, the profiles found by the query may be utilized, either alone or in combination with new profiles formed in block 406.

Block 406 depicts creating or otherwise forming an unclaimed profile for identifying characteristics that could not be matched to an existing profile. The formed profile may be stored in a repository such as a relational database, key-value database, and so forth. In addition to data indicative of the identifying characteristics, the stored profile data can include information about the source of the image or other media file from which the identifying characteristics were derived. This data can include identifiers for a network gateway through which the media file was transmitted, or an identifier for a computing device associated with the network gateway, such as a smartphone that on occasion connects to the Internet via the network gateway. For example, referring again to FIG. 2, the profile module 224 might store the profile in the profile repository 216 along with identification information for the network gateway 206 and/or the computing device 200.

Block 408 depicts locating or forming a profile for a group that corresponds to the individual users represented by the image or other media file. An image or other media file may be said to correspond to a group profile when some or all of the individuals represented in the image or other media file are also represented in the profile.

In some instances, each individual user represented in the image or other media file may be represented in a group profile. This may be determined by matching identifying characteristics for each user represented in the image or other media file to the identifying characteristics stored with user profiles linked to the group profile.

In other instances, there may be a greater number of individual users represented in an image or other media file than there are user profiles associated with any existing groups. In some cases, the profile module 224 may add additional user profiles to a selected group, so that the existing group matches the new photo. Initially, these profiles may be unclaimed. The profile module 224 might also create a new group comprising existing and newly formed profiles corresponding to the users represented in the image or other media file.

In other instances, the image or other media file might contain fewer individuals than are associated with any existing group. The profile module 224 may in some cases create a new group profile that corresponds to the number of users in the image. In other cases, the image or other media file may be matched to the existing group, even though not all of the group's members are present in the image or other media file.

In some cases, groups may be defined based in part on the source of an image. For example, a default "family" group might be used as a default for images with a number of users above a threshold value when taken by a camera embedded in a set-top box. A group image taken on a smartphone and then uploaded through the network gateway, on the other hand, might use a different default, such as a "friends" group for the owner of the smartphone.

In some instances, groups may be defined based on analysis of existing media collections. For example, the number of individuals typically represented in a media collection's images may indicate likely group sizes and group members, even when not all potential members are present at the time the group is formed. The media collection might contain, for example, a number of photographs with two individuals and a number with four individuals. When the two individuals are depicted in an image used as the basis for forming a group, the profile module 224 may create or retrieve a group profile containing the two members, rather than creating or retrieving a group file with four members, or some other size. On the other hand, if three of the four individuals are depicted in the image used as the basis for forming the group, a group consisting of four members might be created or retrieved. The fourth member, the one missing from the image used as the basis for forming the group, might be added to the group profile by forming a user profile with identifying characteristics extracted from an image in the media collection.

Block 410 depicts using the group profile in an application without requiring the group profile or the associated user profiles to be claimed. Utilizing the group profile may involve operations to store, retrieve, and edit properties associated with the group profile, such as adding interest tags, group-related information produced by an application, and so on. These operations may, in various cases, involve determining the identity of the active group without requiring a log-in process or other activity that would require the group profile to have been claimed. In an example scenario, the application 212 may process, on a computing device operating within the data center 222, requests on behalf of the computing device 200. In some cases, this might comprise the application 212 generating HTML pages for rendering by the computing device 200.

Figure 5:
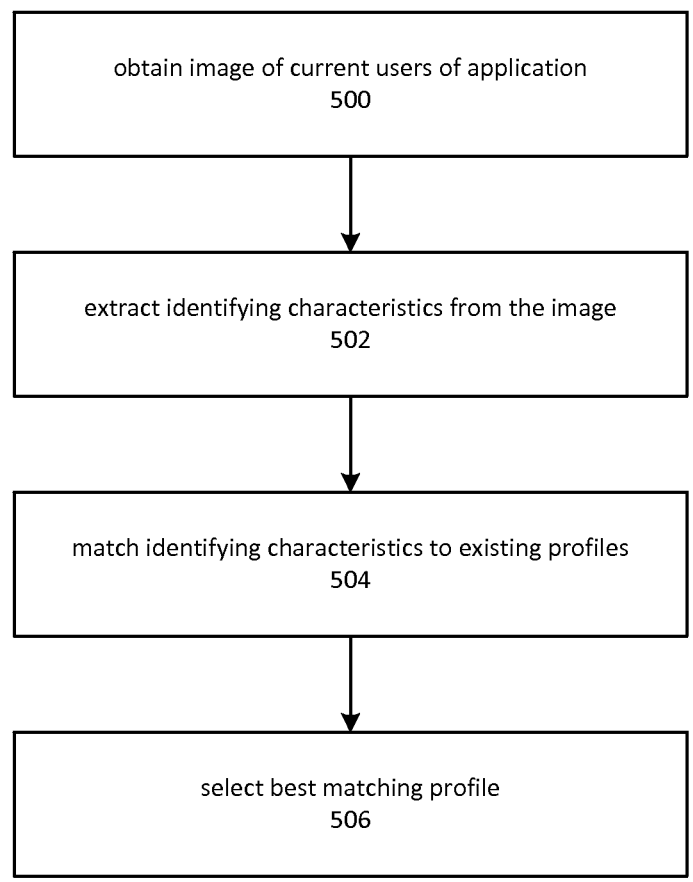
FIG. 5 is a flow diagram depicting an example process for determining the identity of an active group.

FIG. 5 is a flow diagram depicting an example process for determining the identity of an active group. Although FIG. 5 is depicted as a sequence of blocks, the depicted sequence should not be construed as limiting the scope of the present disclosure. In various cases, aspects, and embodiments, the blocks and depicted operations may be altered, omitted, reordered, or performed in parallel.

Block 500 depicts an example of obtaining an image of a current set of users of an application. The image may then be analyzed using techniques similar to those described in connection with FIG. 4. As depicted by block 502, the identifying characteristics may be extracted from the image, for example by locating faces within the image and applying facial recognition techniques to the faces. For example, the recognizer module 210 depicted in FIG. 2 might apply facial recognition to a received image.

At block 504, the identifying characteristics extracted from the image may be matched to existing profiles, which may be claimed or unclaimed. When multiple users are represented in the image, a group profile may be selected based on matching the set of identifying characteristics extracted from the image to the identifying characteristics of users associated with a group. The best matching group may be selected, as depicted by block 506, based on the matched identifying characteristics. Other factors may also be considered, such as a preferred group size. As indicated, the preferred group size may be inferred from other images, such as those obtained from a media collection. In some cases, a group profile may be selected that has a different number of users than are currently using the application. If there are more current users, the additional users might be added as unclaimed profiles associated with the selected group. These aspects might be performed by a profile module 224, as depicted in FIG. 2.

Figure 6:
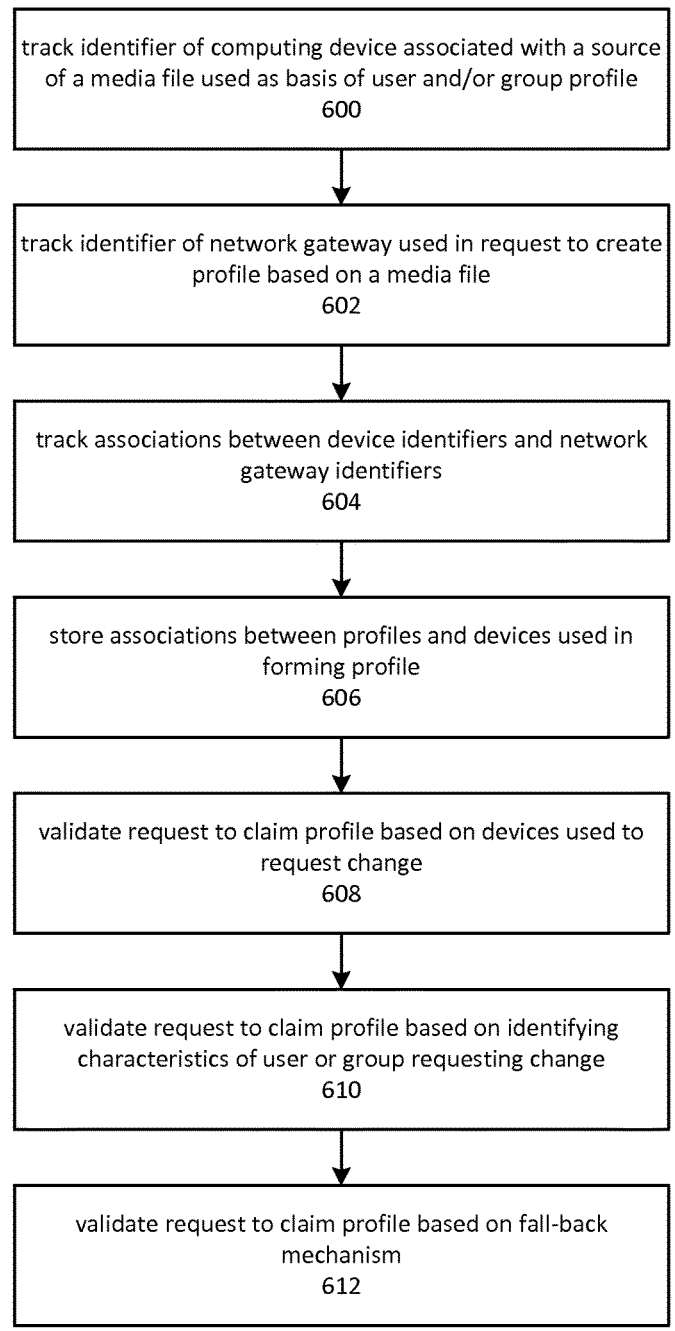
FIG. 6 is a flow diagram depicting an example process for validating a request to claim a profile.

FIG. 6 is a flow diagram depicting an example process for validating a request to claim a profile. Although depicted as a sequence of blocks, the depicted sequence should not be construed as limiting the scope of the present disclosure. In various cases, aspects, and embodiments, the blocks and depicted operations may be altered, omitted, reordered, or performed in parallel.

Block 600 depicts tracking an identifier of a computing device that is associated with a source of a media file used as the basis of a user and/or group profile. The identifier can include a device identifier, MAC address, or other data that can be used to identify a computing device. Digital certificates may be used, in some embodiments, for this purpose. In one example, a computing device such as a smartphone receives an image captured via an embedded camera and then transmits the image in a request to form a new group profile. The smartphone may include its device identifier in the request. The identifier may then be stored in a profile created based on the received image. In an example system, this information might be maintained in a profile repository 310, as depicted in FIG. 3.

Block 602 depicts tracking the identifier of a network gateway used in a request to create a profile using a media file. A request to create a profile may be transmitted by various devices transmitting from a home network via a network gateway connected to an external network such as the Internet. An identifier of the network gateway, such as the gateway's MAC address, can be recorded in association with the profile. In addition, as depicted by block 604, associations between device identifiers and network gateways may be tracked. For example, the profile repository 310 might record that a smartphone with a particular device identifier communicates with endpoints in external networks via a particular network gateway. An identifier of the network gateway, such as a MAC address, may be recorded along with a relationship between the MAC address and the identifier for the smartphone. This information may be used to associate the smartphone with the network gateway, including when the smartphone is at a remote location and not communicating via the network gateway. As an example, referring again to FIG. 3, the profile repository 310 might maintain information related to network gateways and computing devices used in requests to create profiles.

As depicted by block 606, the profile repository 310 may store information indicative of associations between profiles and the computing devices and network gateways. The profile claiming module 308 may then, as depicted by block 608, validate a request to claim a profile, or otherwise edit a profile, based at least in part on the stored associations. In some cases, a request to claim a profile may be authorized when the request to claim the profile was issued by or through a computing device or network gateway that was used when the profile was initially formed. This may involve comparing an identifier of a computing device or gateway involved in a request to claim a profile with an identifier stored in association with a profile. The profile repository 310 might also be used to maintain this information.

Block 610 depicts an alternative or additional validation that may be performed in some instances. As depicted by block 610, the profile claiming module 308 may validate a request to claim a profile based at least in part on one or more identifying characteristics of a user or group of users that are attempting to claim a profile. The profile claiming module 308 might, for example, use extracted identifying characteristics from an image or other media file containing a representation of the current user or group of users, i.e., those attempting to claim a profile. This set might be compared to the identifying characteristics stored in association with an unclaimed profile. The request might then be validated if it can be determined that at least some of the current users were also represented in the image or other media file initially used to form the group.

In some cases and embodiments, an alternative mechanism may be used to validate a request to claim a profile. As depicted by block 612, a request to claim a profile may be validated based on a fall-back method that can be used when other methods fail or are not available. The fall-back method may, for example, be employed in cases where an image or other media file containing identifying characteristics of user is not available, or where the request to claim a profile is not transmitted over the same network gateway or by the device that was used when the profile was initially created. In some embodiments, a fall-back method that may be employed comprises a code presented to the user at the time the profile was created. In some embodiments, the code may be an easy-to-remember word or symbol that can be combined with other validation techniques, such as a partially successful but not conclusive application of a recognition technology. For example, the image of the current user might be recognized as being consistent with the identity of the user who was involved in initially creating the profile, but is not conclusive. The easy-to-remember code might be used in this case as a supplement to the partial recognition. In some cases and embodiments, the code may be presented as an image, pattern, or other data that may be saved or captured with a camera and subsequently presented to claim the profile. The image could, for example, be presented as a one-dimensional or two-dimensional bar code.

Figure 7:
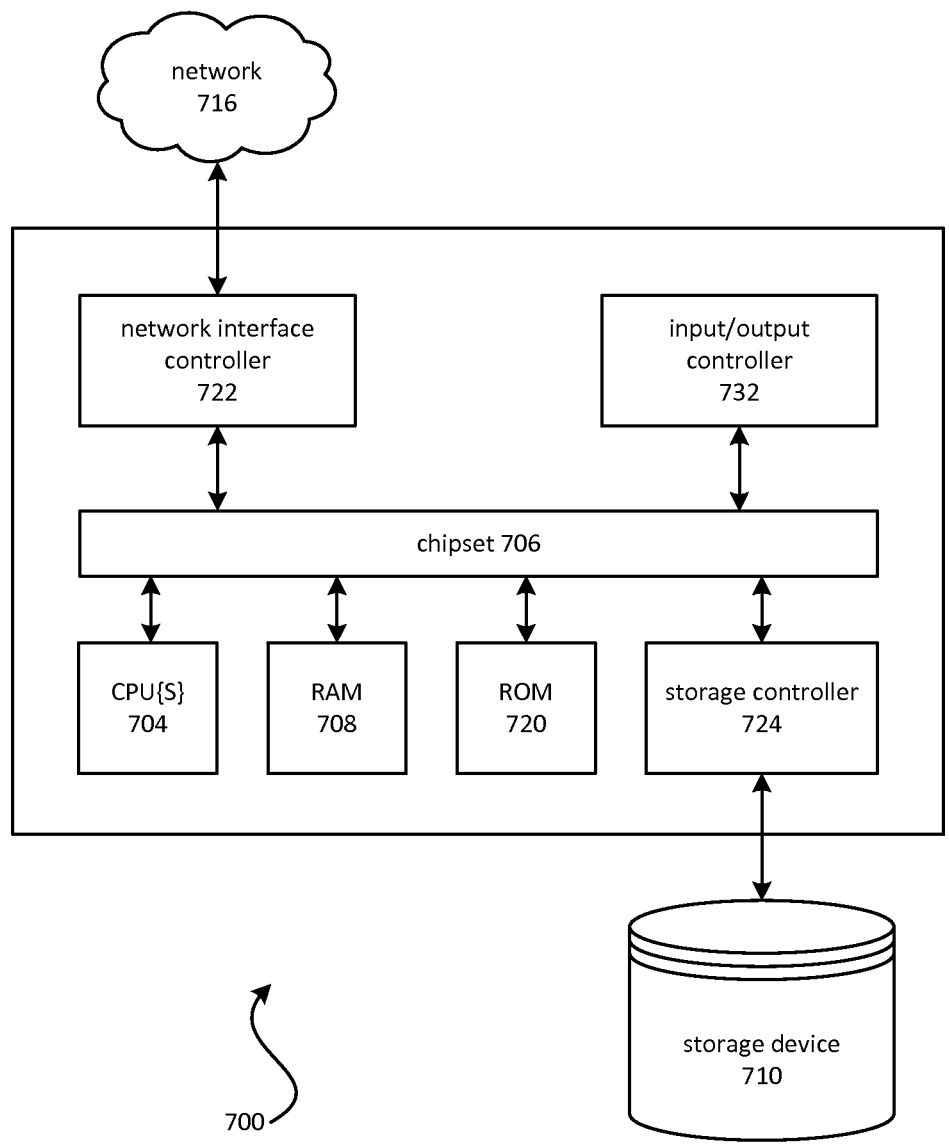
FIG. 7 is a block diagram depicting various aspects of a computing environment in which aspects of the present disclosure may be practiced.

FIG. 7 depicts a computing device that may be used in various aspects, such as the computing device 102 depicted in FIG. 1. The computer architecture shown in FIG. 7 may correspond to a set-top box, remote control device, home automation system, desktop computer, laptop, tablet, network appliance, e-reader, smartphone, or other computing device, and may be utilized to execute any aspects of the computers described herein, such as to implement the operating procedures of FIGS. 4, 5, and 6.

A computing device 700 may include a baseboard, or "motherboard," which is a printed circuit board to which a multitude of components or devices may be connected by way of a system bus or other electrical communication paths. One or more central processing units ("CPUs") 704 may operate in conjunction with a chipset 706. CPU(s) 704 may be standard programmable processors that perform arithmetic and logical operations necessary for the operation of computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may, in various embodiments, be augmented with or replaced by other processing units, such as GPU(s) (now shown). GPU(s) may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory ("RAM") 708 used as the main memory in the computing device 700. The chipset 706 may further provide an interface to a computer-readable storage medium, such as a read-only memory ("ROM") 720 or non-volatile RAM ("NVRAM") (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through a local area network ("LAN") 716. The chipset 706 may include functionality for providing network connectivity through a network interface controller (NIC) 722, such as a gigabit Ethernet adapter. The NIC 722 may be capable of connecting the computing device 700 to other computing nodes over the network 716. It should be appreciated that multiple NICs 722 may be present in the computing device 700, connecting the computing device to other types of networks and remote computer systems.

The computing device 700 may be connected to a mass storage device 710 that provides non-volatile storage for the computing device 700. The mass storage device 710 may store system programs, application programs, other program modules, and data, which have been described in greater detail herein. The mass storage device 710 may be connected to computing device 700 through a storage controller 724 connected to the chipset 706. The mass storage device 710 may consist of one or more physical storage units. A storage controller 724 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 700 may store data on the mass storage device 710 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 710 is characterized as primary or secondary storage and the like.

For example, the computing device 700 may store information to the mass storage device 710 by issuing instructions through the storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may further read information from mass storage device 710 by detecting the physical states or characteristics of one or more particular locations within the physical storage units.

In addition to the mass storage device 710 described above, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

The mass storage device 710 may store an operating system utilized to control the operation of the computing device 700. According to one embodiment, the operating system comprises a version of the LINUX operating system. According to another embodiment, the operating system comprises a version of the WINDOWS SERVER operating system from the MICROSOFT Corporation. According to further aspects, the operating system may comprise a version of the UNIX operating system. Various mobile phone operating systems, such as IOS and ANDROID, may also be utilized in some embodiments. It should be appreciated that other operating systems may also be utilized. The mass storage device 710 may store other system or application programs and data utilized by the computing device 700.

The mass storage device 710 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described above. The computing device 700 may have access to computer-readable storage media storing computer-executable instructions, which, when executed by the computing device 700, may perform operating procedures depicted in FIGS. 4-6.

The computing device 700 may also include an input/output controller 732 for receiving and processing input from a number of input devices, such as a keyboard, a mouse, a touchpad, a touch screen, an electronic stylus, or other type of input device. Similarly, the input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing node may be a physical computing device, such as the computing device 700 of FIG. 7. A computing node may also include a virtual machine host process and one or more virtual machine instances operating on a physical computing device, such as the computing device 700. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes ¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, operations in disclosed methods. Thus, if there are a variety of additional operations that can be performed it is understood that each of these additional operations can be performed with any specific embodiment or combination of embodiments of the disclosed methods.

The present methods and systems may be understood more readily by reference to the following detailed description of preferred embodiments and the examples included therein and to the figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations can be made without departing from the scope or spirit of the present disclosure. Other embodiments will be apparent to those skilled in the art from consideration of the specification and practices disclosed herein. It is intended that the specification and example figures be considered as exemplary only, with a true scope and spirit being indicated by the following claims.

What is claimed is:

1. A method comprising:
    receiving, by a first computing device via a network gateway, an image that comprises a representation of a characteristic of a first user of a second computing device;
    storing, based at least in part on receiving the image, a first profile comprising characteristic information based on the image, wherein the characteristic information is indicative of the characteristic of the first user;
    storing, based at least in part on receiving the image, state information indicating that the first profile has not been claimed for the first user;
    receiving data indicative of a request to claim the first profile for the first user;
    validating the request to claim the first profile based at least in part on determining that the data indicative of the request to claim the first profile was received via the network gateway via which the image was received; and
    updating the first profile to comprise state information indicating that the first profile has been claimed for the first user, based at least in part on validating the request to claim the first profile.

2. The method of claim 1, wherein the image comprises a representation of a characteristic of a second user associated with a second profile.

3. The method of claim 2, further comprising:
    storing a record indicative of a group comprising the first profile and the second profile, wherein the record is usable by an application prior to receiving the request to claim the first profile.

4. The method of claim 1, further comprising:
    determining an identity of a second user based at least in part on characteristic information indicative of a characteristic of the second user, the characteristic information based on the image; and
    storing a second profile claimed for the second user, the second profile claimed based at least in part on the identity of the second user.

5. The method of claim 1, further comprising:
    receiving data indicative of a request to retrieve an unclaimed profile; and
    validating the request based at least in part on in response to determining that the data indicative of the request to retrieve the unclaimed profile was received via the network gateway and that the first profile has not been claimed for the first user.

6. The method of claim 1, wherein the image is received via the network gateway by at least one of coaxial cable or fiber optic cable.

7. A method comprising:
    receiving, by a computing device, information indicative of a characteristic of a first user, wherein the information is based on an image obtained by a device of one or more devices associated with a network gateway;
    storing a first profile comprising the information indicative of the characteristic of the first user and storing information indicating that the first profile has not been claimed for the first user, wherein the first profile is usable by an application prior to receiving a request to claim the first profile for the first user;
    validating the request to claim the first profile based at least in part on determining that the request was transmitted by at least one of the one of the one or more devices associated with the network gateway; and
    storing information indicating that the first profile has been claimed for the first user.

8. The method of claim 7, wherein the image comprises a representation of a characteristic of a second user associated with a second profile.

9. The method of claim 8, further comprising:
    storing a record indicative of a group comprising the first profile and the second profile.

10. The method of claim 7, further comprising:
    determining an identity of a second user based at least in part on information indicative of a characteristic of the second user, the information extracted from the image; and
    storing a second profile claimed for the second user, the second profile claimed based at least in part on the identity of the second user.

11. The method of claim 7, further comprising:
    receiving information indicative of retrieving an unclaimed profile; and
    transmitting the first profile in response to determining that the first profile has not been claimed for the first user and in response to determining that the information indicative of retrieving unclaimed profiles was transmitted by one of the one or more devices associated with the network gateway.

12. The method of claim 7, further comprising:
    matching a face characteristic of a second user represented in the image to a second profile claimed for the second user; and
    forming a record indicative of a group that comprises the first profile and the second profile.

13. The method of claim 7, wherein the information indicative of the characteristic of the first user comprises a bitmap.

14. The method of claim 7, further comprising:
    storing additional information in the first profile, the additional information provided by the first user after the first profile has been claimed for the first user, wherein the additional information is usable by the application after the first profile has been claimed for the first user.

15. The method of claim 7, further comprising:
    validating the request to claim the first profile for the first user by at least comparing the information indicative of the characteristic of the first user to additional information indicative of the characteristic of the first user, the additional information extracted from a second image.

16. A method comprising:
receiving, by a computing device, information indicative of an identifying characteristic of a first user, wherein the information is from a media file associated with a network gateway;
storing a first profile comprising the identifying characteristic of the first user;
storing a group profile comprising one or more profiles, including the first profile, wherein the group profile is usable without a profile of the one or more profiles being claimed; and
validating a request to claim the first profile for the first user based at least in part on determining that the request originated on a computing device associated with the network gateway.

17. The method of claim 16, further comprising:
matching a face of a second user to a second profile claimed for the second user; and
storing information indicative of the group profile comprising the first profile and the second profile.

18. The method of claim 16, further comprising:
associating the group profile with an interest tag based at least in part on one or more media files associated with user profiles included in the group profile.

19. The method of claim 16, further comprising:
validating access by an application to the first profile, prior to receiving the request to claim the first profile, based at least in part on determining that a request to access the first profile was received via the network gateway.

20. The method of claim 16, further comprising:
matching a characteristic represented in the media file to a corresponding characteristic associated with a second profile claimed for a second user; and
storing information indicating that the group profile comprises the first profile and the second profile.

* * * * *